(12) United States Patent
Noguchi et al.

(10) Patent No.: US 7,940,462 B2
(45) Date of Patent: May 10, 2011

(54) ANTIREFLECTIVE STRUCTURE AND ANTIREFLECTIVE MOLDED BODY

(75) Inventors: Yuji Noguchi, Yokosuka (JP); Takayuki Fukui, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 273 days.

(21) Appl. No.: 12/199,120

(22) Filed: Aug. 27, 2008

(65) Prior Publication Data
US 2009/0061150 A1 Mar. 5, 2009

(30) Foreign Application Priority Data

Aug. 28, 2007 (JP) .................................. P2007-221442
Mar. 24, 2008 (JP) .................................. P2008-075699

(51) Int. Cl.
*G02B 27/10* (2006.01)
(52) U.S. Cl. ....................................................... 359/619
(58) Field of Classification Search .......... 359/619–627, 359/359
See application file for complete search history.

(56) References Cited

U.S. PATENT DOCUMENTS
7,094,452 B2 * 8/2006 Yamashita et al. ............ 359/619

FOREIGN PATENT DOCUMENTS
JP 2002-267815 A 9/2002
JP 2005-173457 (A) 6/2005
WO WO 2006/093748 A2 9/2006

OTHER PUBLICATIONS

Picture 1, Acorn, cited in the specification on p. 9, lines 1 and 3., http://uploaded.wikimedia.org/wikipedia/ja/a/a0/Donguri.jpg, Jun. 19, 2008.
Picture 2, Kompeito (Japanese confectionery having protrusions), cited in specification on p. 11, line 10., http://uploaded.wikimedia.org/wikipedia/commons/thumb/5/54/Kompeito.jpg, Jun. 3, 2008
Ralf Bräuer et al., "Design of antireflection gratings with approximate and rigorous methods", Applied Optics, Dec. 1, 1994, vol. 33, No. 34, pp. 7875-7882.
D.S. Hobbs et al, "Design, Fabrication, and Measured Performance of Anti-Reflecting Surface Textures in Infrared Transmitting Materials", Proceedings of the SPIE—The International Society for Optical Engineering, SPIE, Bellingham, VA, vol. 5786, No. 1 (Mar. 26, 2005), pp. 349-364.

(Continued)

*Primary Examiner* — Alicia M Harrington
(74) *Attorney, Agent, or Firm* — Foley & Lardner LLP (57) ABSTRACT

An antireflective structure includes: a flat layer having a surface; a fine structure layer including: fine protrusions each including: a head end part, and a base face which is at least one of: a circular base face of a truncated cone, the circular base face having diameter of circle, and a polygonal base face of a truncated pyramid, the polygonal base face having diameter of circumscribing circle of polygonal base face, the fine protrusions being arranged on the surface of the flat layer to define a pitch, wherein, with first reflective face formed in head end part of each of the fine protrusions, and second reflective face formed between fine protrusions on the surface of flat layer: each of the diameter of the circle and the diameter of the circumscribing circle is smaller than wavelength of incident electromagnetic wave, and the pitch is smaller than wavelength of incident electromagnetic wave.

13 Claims, 4 Drawing Sheets

OTHER PUBLICATIONS

D.G. Stavenga et al., "Light on the moth-eye corneal nipple array of butterflies", Proceedings—Royal Society, Biological Sciences, Royal Society, London, GB, vol. 273 (Dec. 6, 2005) pp. 661-667.

B. Blaesi et al., "Antireflection with Moth-Eye Structures Injection Moulding of Functional Microstructured Surfaces", Kunststoffe, Carl Hanser Verlag, Munchen, DE, vol. 92, No. 5 (May 1, 2002) pp. 15-18.

A. Gombert et al., Subwavelength-Structured Antireflective Surfaces on Glass, Thin Solid Films, 1999, pp. 73-78.

* cited by examiner

$$X = (D/2) \times \{1 - (Z/h)^m\}$$

FIG. 5

ANTIREFLECTIVE STRUCTURE AND ANTIREFLECTIVE MOLDED BODY

BACKGROUND OF THE INVENTION

1. Field of the Invention

The present invention relates to an antireflective structure which is excellent in electromagnetic wave antireflectivity as well as scratchproof.

The present invention also relates to an antireflective molded body which includes the above antireflective structure and is preferably used as a non-reflective panel for bodies, various meters, displays and the like of vehicles (automobiles), ships, aircrafts and the like.

2. Description of the Related Art

In such fields as aircrafts, automobiles, ships and the like, antireflection of electromagnetic wave is necessary for such applications as: i) stealth technology not viewed on radar, ii) an IR measurement camera, a meter cover, a liquid crystal display which are used for measuring vehicle-to-vehicle distance, and the like.

For example, a driver's seat of an automobile has a meter front cover which is embedded in a front face of a display where various meters such as speedometer, fuel meter and the like are received in combination. In this case, however, the scenery outside the vehicle is imaged in through a front window or a side window to the meter front cover, as the case may be, making it difficult to view the various meters of the display. For preventing the above invisibility, a meter hood is disposed above the various meters for blocking an external light from entering the meter display.

A structure including a plurality of thin films having different refractive indexes are conventionally known as a multilayer antireflective film which is used for preventing reflection of the light as stated above.

Japanese Patent Application Laid-Open No. 2002-267815 (=JP2002267815) discloses an antireflective structure using a fine structure, where the antireflective structure is more excellent in lowering reflectivity than the above multilayer antireflective film.

JP2002267815 discloses an antireflective structure where a myriad of fine iregularities (fine protrusions and dents) made of transparent material are formed on a surface of a transparent molded body at pitches each less than or equal to a wavelength of light such that the refractive index of the light varies in the thickness direction.

When a myriad of fine irregularities (fine protrusions and dents) each of which is corrugated or triangular in cross section are formed on the surface, occupancy (ratio of presence) of the transparent material on the outermost surface of the irregularities is limitlessly closer to 0%, which is a state substantially causing a refractive index of air.

Meanwhile, at the base face of the irregularities, occupancy of the air is limitlessly closer to 0%, which is a state substantially causing a refractive index of the transparent material.

Furthermore, an intermediary part of the irregularities has an refractive index according to the cross section occupied by the transparent material.

As such, the refractive index of light continuously varies between the refractive index of air and the refractive index of transparent material in the thickness direction of the antireflective structure.

As a result, according to a principle like that of the multilayer antireflective film having a plurality of thin films with different refractive indexes which vary stepwise, the antireflective structure of JP2002267815 is more excellent than the multilayer antireflective film.

However, JP2002267815 may cause scratches to the surface of the antireflective structure, as the case may be, deteriorating the antireflectivity.

SUMMARY OF THE INVENTION

It is an object of the present invention to provide an antireflective structure capable of improving antireflectivity of an electromagnetic wave and preventing damage to a head end part of each of fine protrusions of irregularities by optimizing shape of the head end part In other words, the object of the present invention is to provide the antireflective structure having both antireflectivity and scratchproof.

According to a first aspect of the present invention, an antireflective structure comprises: a substantially flat layer having a surface; a fine structure layer including: a myriad of truncated fine protrusions each including: a head end part, and a base face which is at least one of: a substantially circular base face of a truncated cone, the circular base face having a diameter D of a circle, and a substantially polygonal base face of a truncated pyramid, the polygonal base face having a diameter D of a circumscribing circle of the polygonal base face, the truncated fine protrusions being arranged on the surface of the flat layer in such a manner as to define a pitch, wherein, with a first reflective face formed in the head end part of each of the truncated fine protrusions, and a second reflective face formed between the truncated fine protrusions on the surface of the flat layer: each of the diameter D of the circle and the diameter D of the circumscribing circle is smaller than a wavelength $\lambda$ of an incident electromagnetic wave, and the pitch is smaller than the wavelength $\lambda$ of the incident electromagnetic wave.

According to a second aspect of the present invention, an antireflective structure comprises: a myriad of truncated fine protrusions each including: a head end part, and a base face which is at least one of: a substantially circular base face of a truncated cone, the circular base face having a diameter D of a circle, and a substantially polygonal base face of a truncated pyramid, the polygonal base face having a diameter D of a circumscribing circle of the polygonal base face, the truncated fine protrusions being arranged on a surface in such a manner as to define a pitch, wherein, with a first reflective face formed in the head end part of each of the truncated fine protrusions, and a second reflective face formed between the truncated fine protrusions on a base end side of the fine protrusions: each of the diameter D of the circle and the diameter D of the circumscribing circle is smaller than a wavelength $\lambda$ of an incident electromagnetic wave, and the pitch is smaller than the wavelength $\lambda$ of the incident electromagnetic wave.

According to a third aspect of the present invention, an antireflective molded body comprises: a substrate having a first face and a second face; and the antireflective structure according to the first aspect, wherein the antireflective structure is provided on at least one of the first face and the second face.

According to a fourth aspect of the present invention, an automobile component comprises: the antireflective molded body according to the third aspect Other objects and features of the present invention will become understood from the following description with reference to the accompanying drawings.

BRIEF DESCRIPTION OF THE DRAWINGS

FIG. 2A to FIG. 2D each show an example of a fine protrusion of the antireflective structure under the present invention, where

DESCRIPTION OF THE PREFERRED EMBODIMENTS

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

Hereinafter, an antireflective structure and an antireflective molded body to which the antireflective structure including a fine structure layer is applied are to be set forth in detail, together with methods of producing the antireflective structure and antireflective molded body and referring to embodiments and examples.

The antireflective structure of the present invention includes a myriad of fine protrusions each of which is shaped into a truncated cone or a truncated pyramid.

In the antireflective structure, each of i) a head end part of the fine protrusion and ii) an area between the truncated fine protrusions has a reflective face (2t, 2b). A base face of the fine protrusion is smaller in size than a wavelength of an incident electromagnetic wave. In addition, the fine protrusions are arranged such that a pitch of the fine protrusion is smaller in size than the above wavelength

First Embodiment

Figure 1:
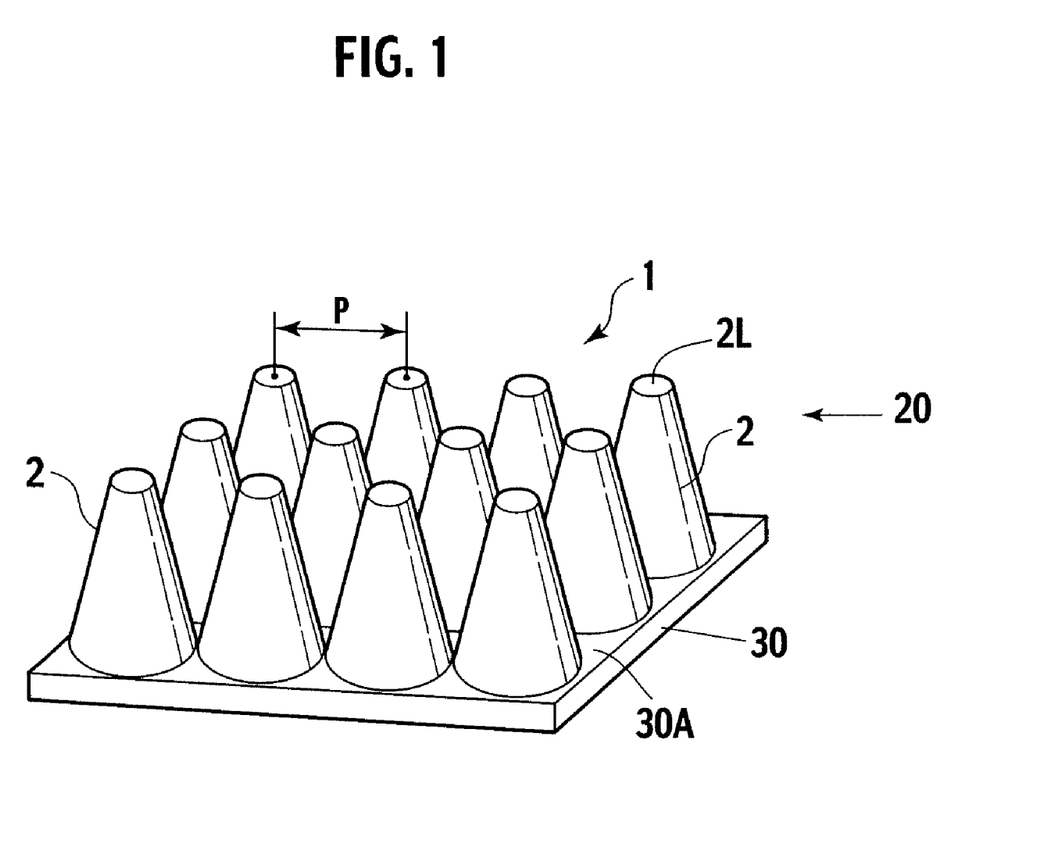
FIG. 1 is a perspective view of an antireflective structure of the present invention.

FIG. 1 shows an antireflective structure 1, according to a first embodiment of the present invention. In the antireflective structure 1 of the present invention, a myriad of fine protrusions 2 each having a flat head end part 2L and shaped substantially into a truncated cone or a truncated pyramid (truncated cone in FIG. 1 according to the first embodiment) are arranged such that a pitch P of the fine protrusion 2 is smaller than a wavelength λ of an incident electromagnetic wave. The fine protrusions 20 form a fine structure layer 20. FIG. 1 also shows a flat layer 30 having a surface 30A on which the fine protrusions 2 are disposed. Hereinabove, a base face 2M of the fine protrusion 2 is smaller in size than the wavelength λ of the incident electromagnetic wave. More specifically, in the case of the truncated cone, a diameter D of a circle 100a of the base face 2M of the fine protrusion 2 is smaller than the wavelength λ of the incident electromagnetic wave (see FIG. 2A). Likewise, in the case of the truncated pyramid, a diameter D of a circumscribing circle 100b of a base polygon 2M is smaller than the wavelength λ of the incident electromagnetic wave (see FIG. 2B, FIG. 2C and FIG. 2D).

The above wavelength λ of the incident electromagnetic wave can bring about the following: On each cross section in a thickness direction of the antireflective structure 1, a refractive index of the electromagnetic wave at each cross section is determined by a presence ratio (i.e., structural material relative to air). The electromagnetic wave's refractive index continuously varied from the air's refractive index to the structural material's refractive index in the thickness direction can bring about antireflectivity of the electromagnetic wave.

Meanwhile, since the head end part 2L of each of the fine protrusions 2 is flattened, the electromagnetic wave reflected from a flat area (second reflective face 2b—to be described afterward) between the fine protrusions 2 is offset by the electromagnetic wave reflected at the head end part 2L, thereby further lowering the reflection.

Moreover, the head end part 2L which is flat and smooth is unlikely to be scratched even when causing friction or having a contact with other members, thus minimizing an influence on the antireflectivity, to thereby meet both the electromagnetic wave antireflectivity and the scratchproof.

Figure 2A:
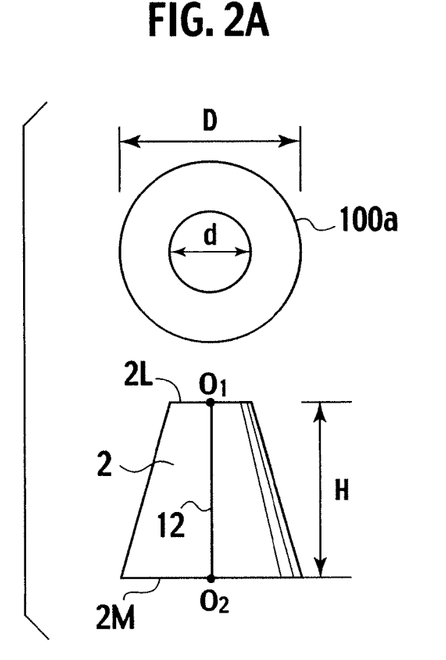
FIG. 2A is a first example showing that the fine protrusion is shaped into a truncated cone.

Hereinafter, the size of the fine protrusion 2 is to be set forth In FIG. 2A showing the fine protrusion 2 shaped into the truncated cone, the diameter D of the base face 2M meets D<λ (wavelength of incident electromagnetic wave). Especially, D≦380 nm is preferred for antireflection of a visible light. From the viewpoint of preventing the reflective light's coloration which may be caused by diffraction, D≦250 nm is preferred. In addition, D≦150 nm is preferred for antireflection of ultraviolet ray while D≦780 nm is preferred for antireflection of near-infrared ray.

In sum, the diameter D of the base face 2M more than or equal to the wavelength λ of the electromagnetic wave cannot make the pitch P (between adjacent fine protrusions 2) shorter than the wavelength λ, thus causing diffraction of the electromagnetic wave, failing to accomplish the antireflection.

Figure 2B:
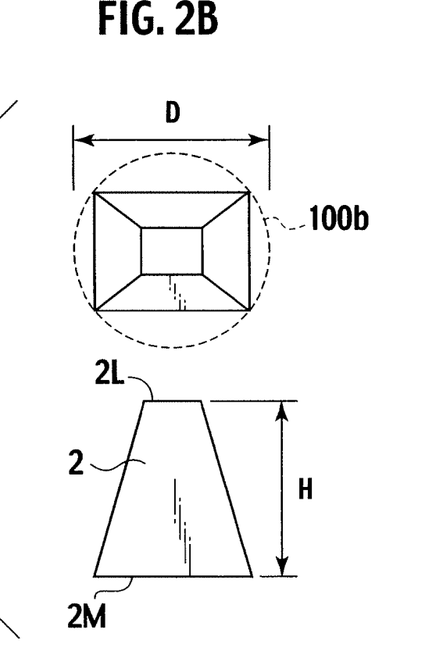
FIG. 2B is a second example showing that the fine protrusion is shaped into a truncated rectangular pyramid.
Figure 2C:
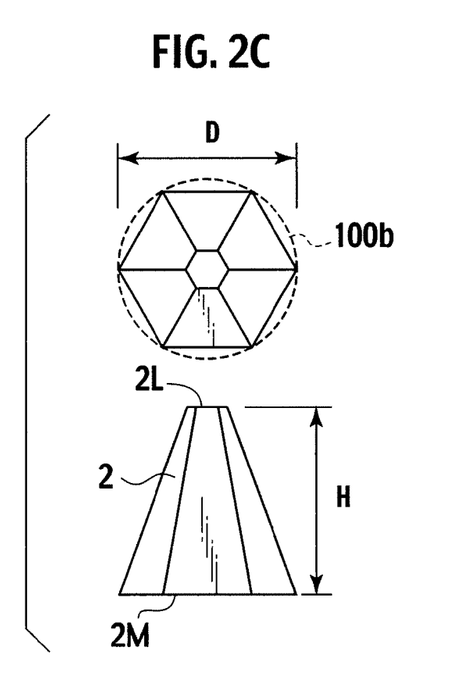
FIG. 2C is a third example showing that the fine protrusion is shaped into a truncated hexagonal pyramid.
Figure 2D:
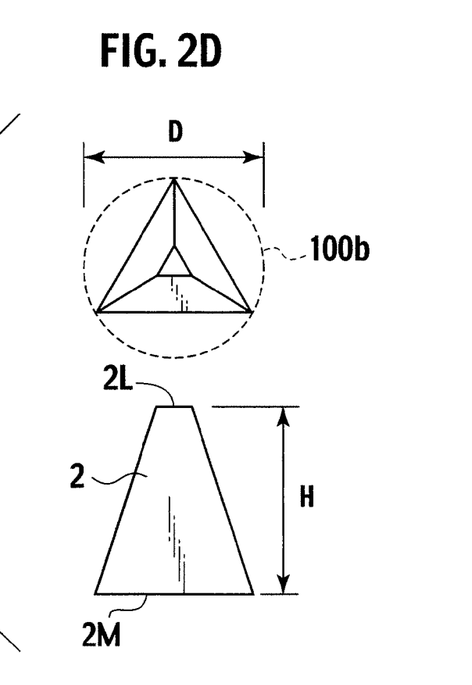
FIG. 2D is a fourth example showing that the fine protrusion is shaped into a truncated triangular pyramid.

Moreover, in the case of the truncated pyramids as shown in FIG. 2B (rectangular), FIG. 2C (hexagonal) and FIG. 2D (triangular), the diameter D of the circumscribing circle 100b of the polygon is defined as the size of the base face 2M.

Under the present invention, for offsetting i) the electromagnetic wave reflected at the head end part 2L by ii) the reflective electromagnetic wave caused from the flat area (second reflective face 2b) between the fine protrusions 2, a first occupancy Rt of a first reflective face 2t, a second occupancy Rb of a second reflective face 2b between the fine protrusions 2, and a height H of the fine protrusion 2 are essential.

Each of the first occupancy Rt and the second occupancy Rb is sampled as a single repetitive unit of the antireflective structures 1.

Figure 3:
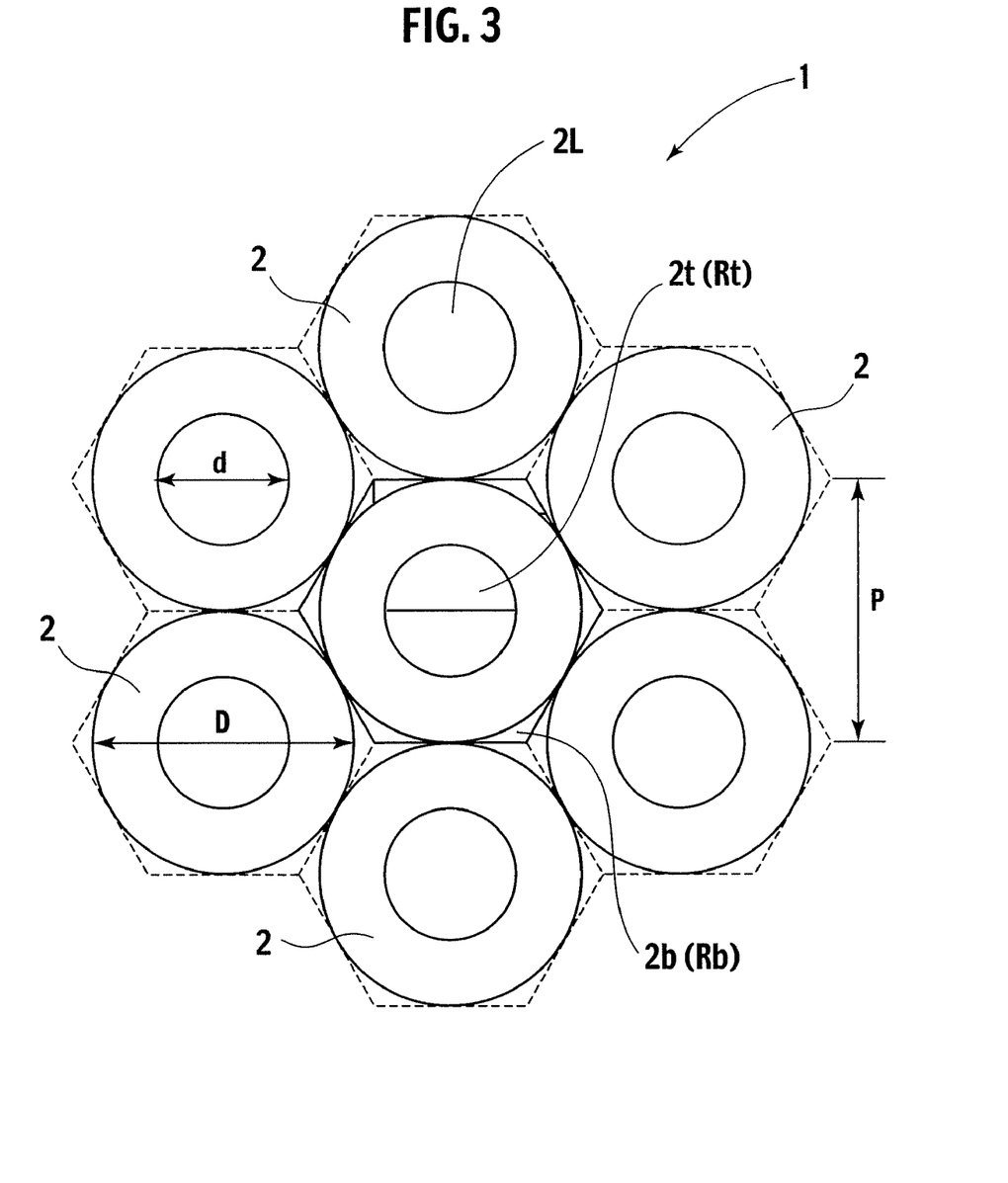
FIG. 3 is a plan view of the antireflective structure for explaining a first occupancy which is an occupancy of a first reflective face of a head end part and a second occupancy which is an occupancy of a second reflective face between the adjacent fine protrusions.

Specifically, in FIG. 3 showing a plan view of the antireflective structure 1, the first reflective face 2t is defined as a flat area at the head end part 2L of the fine protrusion 2, while the second reflective face 2b is formed on a base end side of the fine protrusion 2 and defined as a flat area between the adjacent fine protrusions 2.

The first occupancy Rt is defined as a ratio which is the first reflective face 2t's area relative to a unit area (in FIG. 3, an area of a single unit forming a hexagon). Meanwhile, the second occupancy Rb is defined as a ratio which is the second reflective face 2b's area relative to the above unit area forming the hexagon.

With the antireflective structure 1 of the present invention, a ratio Rt/Rb (first occupancy Rt relative to second occupancy Rb) of 0.2 to 2.0 can improve the antireflectivity of the electromagnetic wave. The ratio Rt/Rb of 0.5 to 1.6 is more preferable.

As long as the above ranges of the ratio Rt/Rb are met, the shape of the head end part 2L of the fine protrusion 2 is not specifically limited and therefore is not necessarily a complete flat face. In other words, dent, bulge or irregularity each of which is within a height of 20 nm do not influence the reflectivity.

Then, the height H of the fine protrusion 2 causes the greatest effect when the reflective electromagnetic wave at the head end part 2L is shifted by p/2 from the reflective electromagnetic wave from the second reflective face 2b between the fine protrusions 2 so as to offset the incident electromagnetic wave.

Specifically, the height H is given by the following expression (1):

Height H={wavelength λ of incident electromagnetic wave/(2×average refractive index n)}×A     Expression (1)

An arbitrary value A within a range of 0.6 to 1.4 is preferable, and more preferably 0.8 to 1.2. The above average refractive index n is defined as a refractive index to the wavelength λ of the incident electromagnetic wave.

When A<0.6, the height H of the fine protrusion 2 is small, making it impossible for the reflective electromagnetic wave from the first and second reflective faces 2t, 2b to make a lower reflection within a target wavelength.

When A>1.4, the height H of the fine protrusion 2 is large, thus calming the refractive index change. In this case, the antireflection can be secured to a certain extent, while the scratchproof is likely to be deteriorated.

Especially, for the purpose of antireflection of the visible light, it is preferred to design the lowest reflectivity at around 540 nm to 560 nm which is a wavelength range causing high sensitivity to the human eye.

The height H's range which is variable with the types of electromagnetic waves may be the one calculated by the above expression (1), preferably, however, the height H is in a range of 80 nm to 160 nm for the range of the ultraviolet ray, 160 nm to 350 nm for the range of the visible light (more preferably, 160 nm to 240 nm) and 350 nm to 45 μm for the range of the infrared ray.

In addition, the above average refractive index n is defined as the one obtained by averaging the refractive indexes from the head end part 2L of the fine protrusion 2 to the base face 2M (base end part or bottom) of the fine protrusion 2.

For calculating the average refractive index n, the single unit fine protrusion 2 is divided into 100 pieces in a direction perpendicular to the direction of the height H of the fine protrusion 2 and then a refractive index is to be calculated from a ratio (solid relative to space) of the single unit, followed by averaging of the thus calculated refractive indexes.

As set forth above, the fine protrusion 2 of the antireflective structure 1 of the present invention is truncated, specifically in FIG. 1, shaped into a truncated cone. However, not only having a configuration of a precise truncated cone (i.e., having a straight generating line) or a precise truncated pyramid (i.e., having a straight ridge line and flat side faces), the fine protrusion 2 of the present invention may have a configuration of an imprecise truncated cone (i.e., having a curved generating line) or an imprecise truncated pyramid (i.e, having curved side faces), as long as the above imprecise truncated fine protrusion 2 has a cross section becoming gradually smaller from the base face 2M to the head end part 2L.

Figure 4:
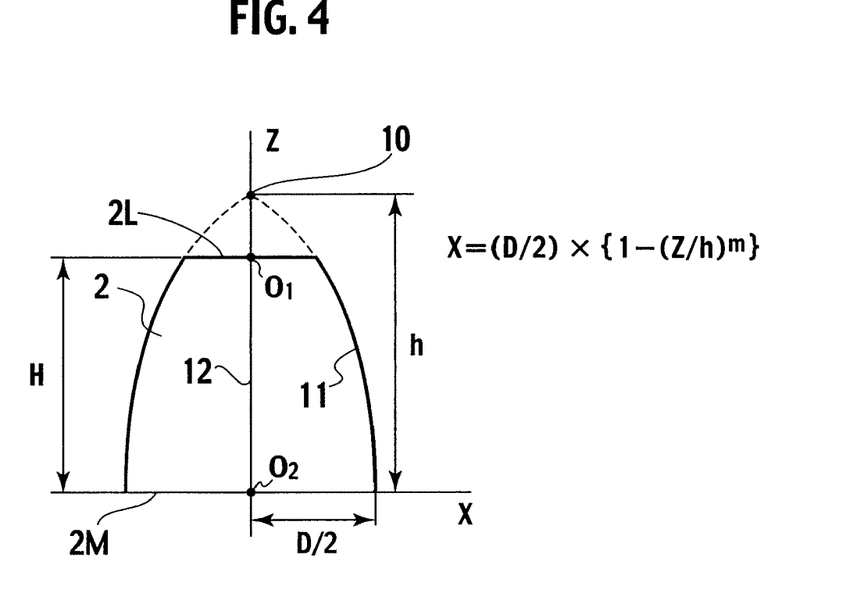
FIG. 4 shows a graph of an m-order linear expression for expressing configuration of a ridge line of the fine protrusion of the antireflective structure under the present invention.

Moreover, a center line 12 connecting a first center O1 of the head end part 2L to a second center O2 of the base face 2M is not necessarily perpendicular to the base face 2M, otherwise may be inclined relative to the base face 2M (see also FIG. 4 to be described afterward).

As such, not only the precise truncated cone or precise truncated pyramid, the language "truncated" of the present invention includes the following shapes:

1) a modified cone (such as bell shape or acorn shape) so configured as to have a flat head end part, 2) a modified cone (such as bell shape or acorn shape) so configured as to have an inclined head end part, 3) a modified pyramid (having curved side faces) so configured to have a flat head end part, and 4) a modified pyramid (having curved side faces) so configured as to have an inclined head end part.

A ridge line 11 of the fine protrusion 2 connects an upper base with a lower base of a ladder-shaped (trapezoid) cross section which is perpendicular to the base face 2M and passes through a gravity center (i.e., first center O1) of the head end part 2L of the fine protrusion 2.

It is preferable that the ridge line 11 has a configuration given by the following linear expression (2) as shown in FIG. 4:

$$\lambda = (D/2) \times \{1 - (Z/h)^m\}$$     Linear expression (2)

With this, change ratio of the refractive indexes n from an apex 10 (imaginary) of the fine protrusion 2 to the base face 2M of the fine protrusion 2 becomes constant, thus more improving the antireflectivity.

In the linear expression (2):

an X-axis is defined on the base side (base face 2M) in the cross section which is perpendicular to the base face 2M and passes through the first center O1 and the second center O2 which are connected by the center line 12, "m" denotes an order ($1 \leq m \leq 1.5$), "h" denotes a height from the base face 2M to the apex 10 which is an intersection of an extension of the center line 12 with an extension of the ridge line 11 and is disposed on a Z-axis.

In this case, depending on the position of the apex 10, the value λ may be corrected by adding a constant.

FIG. 3 also shows a diameter d (head size d) of the head end part 2L.

Moreover, the shape of the base face 2M of the fine protrusion 2 may be any of the followings:

1) substantially circular shape such as circle, ellipse and oval, 2) polygons such as triangle, quadrangle, pentagon, hexagon, and 3) an intermediary shape between circle and polygon, which shape having outwardly swollen sides of polygons.

Among the above, the circle, quadrangle and hexagon are preferable since they are comparatively easy to produce and can be arranged in a packed manner.

In addition, with the fine protrusion 2 as set forth above, it is the diameter D that is defined as the size of the base face 2M. More specifically, the diameter D is categorized as follows depending on shape of the base face 2M:

| | |
|---|---|
| 1) circular base face 2M: | diameter D |
| 2) elliptical or oval base face 2M: | diameter of a longer (major) axis |
| 3) polygonal base face 2M: | diameter D circumscribing the polygon |

From the viewpoint of forming the second reflective face 2b on a base end side (i.e., base face 2M) of the fine protrusion 2 (see FIG. 3), the fine protrusions 2 each having the circular base face 2M can be arranged in a packed manner.

Contrary to the above, the base face 2M of the fine protrusions 2 having any of the following shapes needs to be arranged in such a manner as to define gaps therebetween: an equilateral triangle, an equilateral square and an equilateral hexagon each of which allows the base faces 2M to be arranged on a flat face without gaps.

Materials of the fine protrusion 2 may be basically the same as those of a substrate 201 to be described afterward. In view of improving the antireflectivity as well as durability, however, the fine protrusion 2 is preferably made of the following materials:
  i) resin (to be described afterward), and
  ii) particles each having a diameter in a range of 10 nm to 50 nm (by sphericity conversion).

The above particles are not specifically limited, examples thereof including:
  1) organic particles such as polymethyl methacrylate, polystyrene, amide, imide, polyester and the like,
  2) inorganic oxide-based particles such as silicon dioxide, titanium dioxide, zirconium dioxide, aluminium oxide and the like,
  3) metallic colloidal particles such as gold, silver, platinum, iron and the like,
  4) ceramic-based particles such as barium titanate.

For improving durability of the fine protrusion 2, the inorganic oxide-based particles are especially preferable due to:
  i) having a high compression strength, and
  ii) featuring a good adhesion to resin by reforming the surface of the particle.

Shape of the above particles is not specifically limited, examples thereof including perfect sphere, rugby ball, kompeito (Japanese confectionery having protrusions), indeterminate form, porosity and the like.

The particle too small in size is less likely to be exposed to the surface and causes increased resin wear. Meanwhile, the particle too large in size is less likely to enter the fine protrusion 2 during molding. In sum, too small or too large in size of the particle cannot improve durability of the fine protrusion 2. As such, particles each having a diameter in a range of 10 nm to 50 nm (by sphericity conversion) is preferable, and more preferably 10 nm to 20 nm.

Strength (compression strength) of the particle is preferably greater than or equal to 500 MPa Compression strength less than 500 MPa, as the case may be, leads to wear and thereby decreases particle portion, thus failing to secure durability.

Too small an amount of added particles cannot improve durability of the fine protrusion 2, leading to a fragile molded product (casting); while too large an amount of added particles may deteriorate dispersion of the particles, leading to a deteriorated transparency. As such, the amount of added particles is preferably in a range of 20 weight % to 60 weight %.

Figure 5:
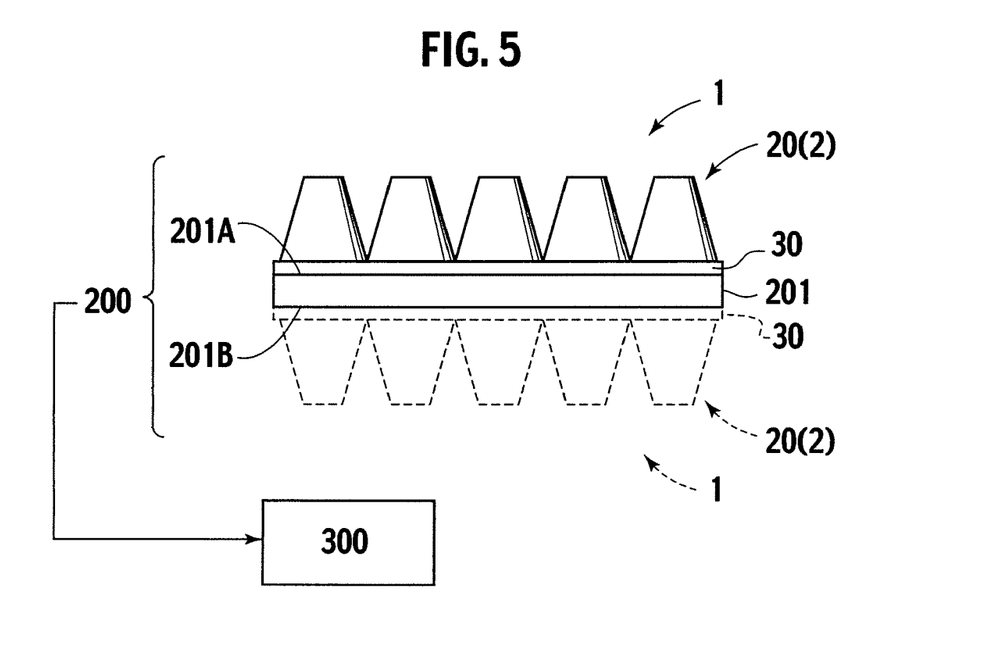
FIG. 5 shows an antireflective molded body and an automobile component to which the antireflective molded body is applied, under the present invention.

As shown in FIG. 5, the antireflective structure 1 of the present invention is to be molded on a first face 201A or preferably on first and second faces 201A, 201B (both faces) of a substrate 201 (or a transparent substrate 201 in the case of visible light), to thereby form an antireflective molded body 200. The thus formed antireflective molded body 200 is applied to i) panels of various displays, ii) show windows and iii) transparent panels of exhibition cases, to thereby decrease reflection of an external light or of a room illumination, thus effectively preventing reflective images from being imaged in. As such, visibility (visual recognition) of image, display, room exhibit can be improved.

Moreover, applying the above antireflective molded body 200 to various components including those for automobiles can bring about like antireflectivity, specific examples of the various parts including: i) glasses of window or roof, ii) meter front cover, iii) head lamp, iv) rear finisher, v) film for frontmost face of display such as liquid crystal, and the like.

FIG. 5 also shows an automobile component 300 to which the antireflective molded body 200 is applied.

<Production of Antireflective Molded Body 200>

The antireflective molded body 200 of the present invention can be produced by the following operations:
  1) preparing a forming die having fine dents which are a counterpart (converted shape) of a myriad of fine protrusions 2 as set forth above,
  2) pressing the forming die and the substrate 201 to each other in a state that at least one of the forming die and the substrate 201 is heated, and
  3) forming the antireflective structure 1 on a surface (i.e., first face 201A) of the substrate 201.

In addition, with an active energy line setting resin intervened between the forming die and the substrate 201, irradiating an active energy line so as to set the resin can form the antireflective structure 1 on the surface (i.e., first face 201A) of the substrate 201, thereby forming the antireflective molded body 200.

Preferably, materials of the substrate 201 typically have transparency, examples of the materials including:
  1) thermoplastic resins such as polyethylene, polypropylene, polyvinyl alcohol, polyvinylidene chloride, polyethylene terephthalate, polyvinyl chloride, polystyrene, ABS resin, AS resin, acrylic resin, polyamide, polyacetal, polybutylene terephthalate, glass-reinforced polyethylene terephthalate, polycarbonate, modified polyphenylene ether, polyphenylene sulfide, polyetherether ketone, liquid crystalline polymer, fluorine resin, polyallate, polysulfone, polyethersulfone, polyamideimide, polyetherimide, thermoplastic polyimide and the like,
  2) thermosetting resins such as phenol resin, melamine resin, urea resin, epoxy resin, unsaturated polyester resin, alkyd resin, silicone resin, diallyl phthalate resin, polyamide bismaleimide, polybisamide triazole and the like, and
  3) a blend of two or more of the above.

Moreover, examples of the active energy line setting resins which initiates polymeriation by an irradiation of rays such as ultraviolet ray so as to be set include: ultraviolet ray setting acryl urethane resin, ultraviolet ray setting polyester acrylate resin, ultraviolet ray setting epoxy acrylate resin, ultraviolet ray setting polyol acrylate resin, ultraviolet ray setting epoxy resin and the like.

If necessary:
  1) polymerization initiator for causing radials by irradiating the active energy line may be used, and
  2) setting agent such as isocyanate for setting the resin more solidly may be added.

Hereinabove, typical examples of the active energy line include ultraviolet ray, X-ray, other electron beams or electromagnetic waves and the like, but not specifically limited thereto.

In addition, an inorganic transparent material such as glass and the like may be used for the substrate 201.

In this case, the antireflective structure 1 can be formed on the surface (i.e., first face 201A) of the substrate 201 by the following operations:

1) cutting a surface of the glass by means of an electron beam or the like.

2) flowing a melted inorganic transparent material into a mold having a configuration of the antireflective structure 1 of the present invention.

EXAMPLES

Hereinafter, the present invention is to be set forth more in detail referring to examples. It is needless to say, however, that the present invention is not limited to the examples.

Example 1

A mold developed by a commercial electron beam drawing device was used. The mold was heated to 170° C. Then, 10 MPa of a pressure was applied to first and second faces 201A, 201B (both faces) of a polycarbonate ("PC" for short) substrate 201 for 1 hr, followed by cooling at less than or equal to 70° C., to thereby prepare an antireflective molded body 200 having both faces each formed with the antireflective structure 1 where the fine protrusions 2 are arranged in a hexagonal packed structure (pitch P: 1000 nm), as shown in Table 1. Each of the fine protrusions 2 has the following specifications:

| 1) Overall configuration | Truncated cone |
|---|---|
| 2) Diameter D of base face 2M: | 1000 nm |
| 3) Diameter d of head end face 2L: | 250 nm |
| 4) Height H: | 750 nm |

Then, the thus prepared antireflective molded body 200 was subjected to an irradiation of an infrared ray having a wavelength of 2000 nm, so as to measure reflectivity at an incident angle of 0 degree and a measurement angle of 0 degree, to thereby evaluate antireflectivity.

Then, a surface of the antireflective molded body 200 was subjected to 5000 wiping operations (round trips, i.e., reciprocations) with a face pressure of 392 Pa, and then was subjected to a visual test for checking for scratches (scratchproof test).

Scratchproof test criteria:

| Scratch visually found: | Rejected |
|---|---|
| Scratch visually not found: | Accepted |

Table 2 shows results of the antireflectivity and scratchproof tests.

Example 2

A mold developed by a like electron beam drawing device was used. Operations like those of the example 1 were repeated, to thereby prepare an antireflective molded body 200 including a polymethyl methacrylate ("PMMC" for short) substrate 201 having first and second faces 201A, 201B each formed with the antireflective structure 1 where the fine protrusions 2 are arranged in a hexagonal packed structure (pitch P: 300 nm), as shown in Table 1. Each of the fine protrusions 2 has the following specifications:

| 1) Overall configuration | Truncated cone |
|---|---|
| 2) Diameter D of base face 2M: | 300 nm |
| 3) Diameter d of head end face 2L: | 45 nm |
| 4) Height H: | 220 nm |

Then, the thus prepared antireflective molded body 200 was subjected to an irradiation of a visible light having a wavelength of 555 nm, so as to measure reflectivity at an incident angle of 0 degree and a measurement angle of 0 degree, to thereby evaluate antireflectivity.

Then, the scratchproof test was implemented on a surface of the antireflective molded body 200 in a manner like that according to the example 1.

Table 2 shows results of the antireflectivity and scratchproof tests.

Examples 3 to 5, 8, 9

Operations like those of the example 2 were repeated, to thereby prepare an antireflective molded body 200 including a polymethyl methacrylate substrate 201 having first and second faces 201A, 201B each formed with the antireflective structure 1 where the fine protrusions 2 are arranged in a hexagonal packed structure, as shown in Table 1. Each of the fine protrusions 2 has the following specifications:

| 1) Overall configuration | Truncated cone |
|---|---|
| 2) Diameter D of base face 2M: | See Table 1 |
| 3) Diameter d of head end face 2L: | See Table 1 |
| 4) Height H: | See Table 1 |

Then, each of the thus prepared antireflective molded bodies 200 was subjected to the evaluations on reflectivity and scratchproof in a manner like that of the example 2.

Table 2 shows results of the antireflectivity and scratchproof tests.

Examples 6, 7

Operations like those of the example 2 were repeated, to thereby prepare an antireflective molded body 200 including a polymethyl methacrylate substrate 201 having first and second faces 201A and 201B each formed with the antireflective structure 1 where the fine protrusions 2 are arranged in a hexagonal packed structure, as shown in Table 1. Each of the fine protrusions 2 has the following specifications:

| 1) Overall configuration | Truncated cone |
|---|---|
| 2) Diameter D of base face 2M: | See Table 1 |
| 3) Diameter d of head end face 2L: | See Table 1 |
| 4) Height H: | See Table 1 |
| 5) Ridge line 11 from outer periphery of head end face 2L to outer periphery of base face 2M: | Given by the linear expression (2) with the order m = 1.2 (for the example 6) and 1.5 (for the example 7) |

Then, each of the thus prepared antireflective molded bodies 200 was subjected to the evaluations on reflectivity and scratchproof in a manner like that of the example 2.

Table 2 shows results of the antireflectivity and scratch-proof tests.

Example 10

Toluene dispersed silica sol (sphericity conversion particle diameter: 30 nm, compression strength of particle: 6.2 GPa, concentration: 20% solution) was mixed into 70 mass % of UV (ultraviolet) setting acrylic resin (polymethyl methacrylate) and 10 mass % of γ methacryloxy propyl trimethoxy silane, such that solid content becomes 30 weight %. Then, the mixture was applied to a polymethyl methacrylate substrate 201 in such a manner as to form a film thickness of 50 μm.

Then, the mold same as that prepared in the example 1 was pressed on the surface of the film, followed by an ultraviolet ray irradiation for 10 minutes using a high pressure mercury lamp (80 W), to thereby prepare an antireflective molded body 200 including the antireflective structure 1 where the fine protrusions 2 made of resin and silica particle are arranged in a hexagonal packed structure, as shown in Table 1. Each of the fine protrusions 2 has the following specifications:

| | |
|---|---|
| 1) Overall configuration | Truncated cone |
| 2) Diameter D of base face 2M: | See Table 1 |
| 3) Diameter d of head end face 2L: | See Table 1 |
| 4) Height H: | See Table 1 |

Then, the thus prepared antireflective molded body 200 was subjected to the evaluations on reflectivity and scratch-proof in a manner like that of the example 1.

Table 2 shows results of the antireflectivity and scratch-proof tests.

Example 11

Operations like those of the example 10 were repeated, other than that the toluene dispersed silica sol (sphericity conversion particle diameter: 10 nm, compression strength of particle: 6.2 GPa, concentration: 30% solution) was used and that the mold same as that in the example 3 was used, to thereby prepare an antireflective molded body 200 like that of the example 10.

Then, the thus prepared antireflective molded body 200 was subjected to the evaluations on reflectivity and scratch-proof in a manner like that of the example 2.

Table 2 shows results of the antireflectivity and scratch-proof tests.

Comparative Example 1

Operations like those of the example 2 were repeated by using a molded developed by the like electron beam drawing device, to thereby prepare an antireflective molded body 200 including a polymethyl methacrylate substrate 201 having first and second faces 201A, 201B each formed with the antireflective structure 1 where the fine protrusions 2 are arranged in a hexagonal packed structure (pitch P: 200 nm), as shown in Table 1. Each of the fine protrusions 2 has the following specifications:

| | |
|---|---|
| 1) Overall configuration | Cone |
| 2) Diameter D of base face 2M: | 200 nm |
| 3) Diameter d of head end face 2L: | 0 nm (not defined) |
| 4) Height H: | 200 nm |

Then, the thus prepared antireflective molded body 200 was subjected to the evaluations on reflectivity and scratch-proof in a manner like that of the example 2.

Table 2 shows results of the antireflectivity and scratch-proof tests.

TABLE 1

PC denotes polycarbonate and PMMC denotes polymethyl methacrylate

| | Substrate 201 | | | Configuration and sizes of fine protrusion 2 | | | | | | | |
|---|---|---|---|---|---|---|---|---|---|---|---|
| Section | Incident wavelength λ (nm) | Material | Refractive index n | Diameter D (nm) | Diameter d (nm) | Height H (nm) | Arbitrary value A | First occupancy Rt | Second occupancy Rb | Ratio Rt/Rb | Order m {of ridge line 11's linear expression (2)} |
| Example 1 | 2000 | PC | 1.20 | 1000 | 250 | 750 | 0.900 | 0.0567 | 0.0936 | 0.606 | 1 (straight) |
| Example 2 | 555 | PMMC | 1.18 | 300 | 45 | 220 | 0.935 | 0.0204 | 0.0936 | 0.218 | 1 (straight) |
| Example 3 | 555 | PMMC | 1.19 | 250 | 50 | 160 | 0.686 | 0.0363 | 0.0936 | 0.388 | 1 (straight) |
| Example 4 | 555 | PMMC | 1.23 | 200 | 70 | 200 | 0.884 | 0.1110 | 0.0936 | 1.187 | 1 (straight) |
| Example 5 | 555 | PMMC | 1.19 | 100 | 35 | 200 | 0.858 | 0.1110 | 0.0936 | 1.187 | 1 (straight) |
| Example 6 | 555 | PMMC | 1.27 | 200 | 40 | 240 | 1.098 | 0.0363 | 0.0936 | 0.388 | 1.2 |
| Example 7 | 555 | PMMC | 1.24 | 200 | 80 | 240 | 1.072 | 0.1450 | 0.0936 | 1.550 | 1.5 |
| Example 8 | 555 | PMMC | 1.25 | 200 | 90 | 160 | 0.721 | 0.1836 | 0.0936 | 1.962 | 1 (straight) |
| Example 9 | 555 | PMMC | 1.21 | 100 | 30 | 320 | 1.395 | 0.0816 | 0.0936 | 0.872 | 1 (straight) |
| Example 10 | 2000 | PMMA + particle | 1.17 | 1000 | 250 | 750 | 0.900 | 0.0567 | 0.0936 | 0.606 | 1 (straight) |
| Example 11 | 555 | PMMA + particle | 1.19 | 250 | 50 | 160 | 0.686 | 0.0363 | 0.0936 | 0.388 | 1 (straight) |
| Comparative example 1 | 555 | PMMC | 1.17 | 200 | 0 | 200 | 0.843 | 0 | 0.0936 | 0 | 1 (straight) |

TABLE 2

| Section | Performance tests | |
|---|---|---|
| | Reflectivity (%) | Scratchproof |
| Example 1 | 0.38 | Accepted |
| Example 2 | 0.45 | Accepted |
| Example 3 | 0.39 | Accepted |
| Example 4 | 0.12 | Accepted |
| Example 5 | 0.12 | Accepted |
| Example 6 | 0.13 | Accepted |
| Example 7 | 0.21 | Accepted |
| Example 8 | 0.38 | Accepted |
| Example 9 | 0.16 | Accepted |
| Example 10 | 0.35 | Accepted |
| Example 11 | 0.38 | Accepted |
| Comparative example 1 | 1.20 | Rejected |

As a result, it was verified that each of the examples 1 to 11 of the present invention shows a low reflectivity to the incident electromagnetic wave.

Contrary to the examples 1 to 11 of the present invention, the antireflective structure of the comparative example 1 is weak in antireflectivity as well as scratchproof due to the following: the fine protrusion is conical (not truncated) therefore the head end part has no reflective face (diameter d=0) of the incident electromagnetic wave.

In addition, the above evaluations do not show that scratchproof of each of the examples 10 and 11 is different from that of the examples 1 to 9. With more stringent evaluations, however, the examples 10 and 11 are supposed to be more excellent in scratchproof than the examples 1 to 9.

Although the present invention has been described above by reference to an embodiment and examples, the present invention is not limited to the embodiment and examples described above. Further modifications or variations of those described above will occur to those skilled in the art, in light of the above teachings.

This application is based on prior Japanese Patent Application Nos. P2007-221442 (filed on Aug. 28, 2007 in Japan) and P2008-075699 (filed on Mar. 24, 2008 in Japan). The entire contents of the Japanese Patent Application Nos. P2007-221442 and P2008-075699 from which priorities are claimed are incorporated herein by reference, to take protection against translation errors or omitted portions.

The scope of the present invention is defined with reference to the following claims.

What is claimed is:

1. An antireflective structure comprising:
a substantially flat layer having a surface;
a fine structure layer including:
    a myriad of truncated fine protrusions each including:
    a head end part, and
    a base face which is at least one of:
        a substantially circular base face of a truncated cone, the circular base face having a diameter D of a circle, and
        a substantially polygonal base face of a truncated pyramid, the polygonal base face having a diameter D of a circumscribing circle of the polygonal base face,
    the truncated fine protrusions being arranged on the surface of the flat layer in such a manner as to define a pitch,
wherein, with a first reflective face formed in the head end part of each of the truncated fine protrusions, and a second reflective face formed between the truncated fine protrusions on the surface of the flat layer:
each of the diameter D of the circle and the diameter D of the circumscribing circle is smaller than a wavelength λ of an incident electromagnetic wave, the wavelength λ being a wavelength of visible light, and the pitch is smaller than the wavelength λ of the incident electromagnetic wave,
a ratio is in a range of 0.2 to 2, where the ratio is given by dividing:
    a first occupancy of the first reflective faces, by
    a second occupancy of the second reflective faces, and
a height H of each of the fine protrusions is given by the following expression (1):

$$H = A \times (\lambda/2n) \quad \text{expression (1)}$$

where n denotes an average refractive index of parts forming the fine protrusions and A denotes an arbitrary value in a range of 0.6 to 1.4,
each of the diameter D of the circle and the diameter D of the circumscribing circle is less than or equal to 380 nm,
the pitch is less than or equal to 380 nm, and
the height H of each of the fine protrusions is in a range of 160 nm to 350 nm.

2. The antireflective structure according to claim 1, wherein the ratio is in a range of 0.5 to 1.6.

3. The antireflective structure according to claim 1, wherein the arbitrary value A is in a range of 0.8 to 1.2.

4. The antireflective structure according to claim 1, wherein
a ridge line of each of the truncated fine protrusions is a curve which is so configured as to meet the following expression (2):

$$X = (D/2) \times \{1 - (Z/h)^m\} \quad \text{expression (2)}$$

where
    an X-axis is defined on the base face in a cross section which is perpendicular to the base face and passes through a first center of the head end part and a second center of the base face, the first center and the second center being connected by a center line,
    m denotes an order in a range of 1 to 1.5, and
    h denotes a height from the base face to an apex which is an intersection of an extension of the center line with an extension of the ridge line and is disposed on a Z-axis.

5. The antireflective structure according to claim 4, wherein
the height H of each of the fine protrusions is in a range of 160 nm to 240 nm.

6. The antireflective structure according to claim 4, wherein
the each of the diameter D of the circle and the diameter D of the circumscribing circle is less than or equal to 250 nm, and
the pitch is less than or equal to 250 nm.

7. The antireflective structure according to claim 1, wherein
each of the fine protrusions includes:
    a particle having a diameter in a range of 10 nm to 50 nm which is calculated by a sphericity conversion, and
    a resin.

8. An antireflective molded body comprising:
a substrate having a first face and a second face; and
the antireflective structure according to claim 1,
wherein the antireflective structure is provided on at least one of the first face and the second face.

9. The antireflective molded body according to claim 8, wherein
the substrate is transparent, and
a material of the fine protrusions is substantially the same as a material of the substrate.

10. An automobile component comprising:
the antireflective molded body according to claim 8.

11. The antireflective structure according to claim 1, wherein the second reflective face is formed by a flat area between adjacent truncated fine protrusions on the surface of the flat layer.

12. An antireflective structure comprising:
a myriad of truncated fine protrusions each including:
  a head end part, and
  a base face which is at least one of:
    a substantially circular base face of a truncated cone, the circular base face having a diameter D of a circle, and
    a substantially polygonal base face of a truncated pyramid, the polygonal base face having a diameter D of a circumscribing circle of the polygonal base face,
  the truncated fine protrusions being arranged on a surface of the antireflective structure in such a manner as to define a pitch,
wherein, with a first reflective face formed in the head end part of each of the truncated fine protrusions, and a second reflective face formed between the truncated fine protrusions on a base end side of the fine protrusions:
  each of the diameter D of the circle and the diameter D of the circumscribing circle is smaller than a wavelength $\lambda$ of an incident electromagnetic wave, the wavelength $\lambda$ being a wavelength of visible light, and
  the pitch is smaller than the wavelength $\lambda$ of the incident electromagnetic wave, and
  a ratio is in a range of 0.2 to 2, where the ratio is given by dividing:
    a first occupancy of the first reflective faces, by
    a second occupancy of the second reflective faces, and
  a height H of each of the fine protrusions is given by the following expression (1):

$$H = A \times (\lambda/2n) \qquad \text{expression (1)}$$

where n denotes an average refractive index of parts forming the fine protrusions and A denotes an arbitrary value in a range of 0.6 to 1.4,
  each of the diameter D of the circle and the diameter D of the circumscribing circle is less than or equal to 380 nm,
  the pitch is less than or equal to 380 nm, and
  the height H of each of the fine protrusions is in a range of 160 nm to 350 nm.

13. The antireflective structure according to claim 12, wherein the second reflective face is formed by a flat area on the surface of the antireflective structure and between the base end sides of the fine protrusions.

* * * * *